United States Patent
Guzak et al.

[19]

[11] Patent Number: 5,924,099
[45] Date of Patent: *Jul. 13, 1999

[54] DATA TRANSFER WITH EXPANDED CLIPBOARD FORMATS

[75] Inventors: Christopher J. Guzak, Kirkland; Satoshi Nakajima, Bellevue, both of Wash.

[73] Assignee: Microsoft Corporation, Redmond, Wash.

[*] Notice: This patent is subject to a terminal disclaimer.

[21] Appl. No.: 09/092,587

[22] Filed: Jun. 5, 1998

Related U.S. Application Data

[63] Continuation of application No. 08/800,973, Feb. 19, 1997, Pat. No. 5,765,156, which is a continuation of application No. 08/355,397, Dec. 13, 1994, abandoned.

[51] Int. Cl.⁶ .................................................... G06F 17/30
[52] U.S. Cl. ........................... 707/100; 707/101; 707/104
[58] Field of Search .................................. 707/100, 101, 707/104, 500, 513, 515; 345/326, 333, 335, 339

[56] References Cited

U.S. PATENT DOCUMENTS

| | | | |
|---|---|---|---|
| 5,261,080 | 11/1993 | Khoyi et al. | 395/500 |
| 5,313,581 | 5/1994 | Giokas et al. | 395/680 |
| 5,386,564 | 1/1995 | Shearer et al. | 707/101 |
| 5,392,386 | 2/1995 | Chalas | 345/355 |
| 5,680,616 | 10/1997 | Williams et al. | 707/103 |
| 5,740,439 | 4/1998 | Atkinson et al. | 395/701 |
| 5,765,156 | 6/1998 | Guzak et al. | 707/100 |

*Primary Examiner*—Paul V. Kulik
*Assistant Examiner*—Greta L. Robinson
*Attorney, Agent, or Firm*—Christensen O'Connor; Johnson & Kindness PLLC

[57] ABSTRACT

A computer system provides expanded clipboard formats that embellish the number of formats that may be used with a clipboard. These expanded clipboard formats enable users in applications to broaden their use of the clipboard and other data transfer mechanisms. The clipboard formats may be utilized by a conventional clipboard, by drag-and-drop mechanisms and by OLE data transfer mechanisms. Certain of the expanded clipboard formats are adapted for use in the data transfer of non-file system objects.

7 Claims, 6 Drawing Sheets

DATA TRANSFER WITH EXPANDED CLIPBOARD FORMATS

This is a continuation of U.S. patent application Ser. No. 08/800,973, filed Feb. 19, 1997, now U.S. Pat. No. 5,765,156 on Jun. 9, 1998, which is a file wrapper continuation of U.S. patent application Ser. No. 08/355,397, filed Dec. 13, 1994, now abandoned.

TECHNICAL FIELD

The present invention relates generally to data processing systems and, more particularly, to data transfer within the data processing system.

BACKGROUND OF THE INVENTION

The clipboard is a data transfer feature of the "MICROSOFT" WINDOWS, version 3.1, operating system sold by Microsoft Corporation of Redmond, Wash. The clipboard is used to transfer data between applications or within a single application. The clipboard includes a set of functions and messages that enable applications to transfer data via the clipboard. The clipboard may be viewed as a common area for storing data handles (i.e., unique identifiers for data objects) to which applications can exchange formatted data. The "MICROSOFT" WINDOWS, version 3.1, operating system enumerates a fixed number of clipboard formats. For example, the CF_BITMAP clipboard format is used for transferring bitmaps, and the CF_TEXT clipboard format is used for transferring arrays of text characters. The clipboard may simultaneously hold the same data in different clipboard formats.

Users of applications use the clipboard by calling clipboard commands, such as "cut", "copy" or "paste". The copy clipboard command copies a selected portion of data in a clipboard format to the clipboard by copying a handle to the data object that holds the selected portion of data in a clipboard format to the clipboard. The selected portion of data is not removed from the source from which it originated. The cut clipboard command is similar to the copy command in that it copies a selected portion of data to the clipboard, but the cut clipboard command differs from the copy clipboard command in that it removes the selected portion of data from the source of the data. The paste clipboard command copies data from the clipboard to a destination.

The Microsoft OLE 2.01 protocol, established by Microsoft Corporation, provides a mechanism for facilitating drag and drop operations. This mechanism uses clipboard formats. The data, however, is not passed through the system store that is used for cut and copy operations; instead, the transfer is directed from source to destination.

Although the clipboard is useful, the formatting constraints are too limiting for many applications. In particular, the number of clipboard formats provided by the system is too few, and the available formats are too limited.

SUMMARY OF THE INVENTION

The present invention overcomes the limitations of the conventional systems by providing expanded clipboard formats. These expanded clipboard formats may include a clipboard format for holding the contents of a file so that data, that is not a file, may be transferred and as part of the transfer, the data is encapsulated into a file. The expanded clipboard formats may also include a clipboard format for holding a file group descriptor. The file group descriptor holds a number of file descriptors and each file descriptor holds descriptive information about a file or about data that is to be incorporated into a file during a data transfer operation.

The expanded clipboard formats provided by an embodiment of the present invention may include a file list clipboard format for storing a value for accessing a file list structure. The file list structure describes a list of files. This file list clipboard format, like other clipboard formats, may be used during data transfer operations.

The expanded clipboard formats may also include an object positions clipboard format for storing relative positions of graphical objects when displayed on an output device. This clipboard format may be used for data transfers of objects to preserve the relative object positions of the graphical objects that are associated with the objects after the data transfer operation is completed.

The expanded clipboard formats may also include a filename map clipboard format for holding a list of alternative names for items that are being transferred during a data transfer operation. A list of alternative names held in the filename map clipboard format may be used to rename the files once the data transfer is completed.

Expanded clipboard formats provided by embodiments of the present invention may also include selected clipboard formats for holding data that enables access to non-file system objects. Certain computer systems may include file system objects and non-file system objects within a common namespace. This expanded clipboard format facilitates data transfers of the non-file system objects in the selected clipboard format. The non-file system objects may include network resources, printers, or other types of objects.

The expanded clipboard formats provided by embodiments of the present invention may include an ID list clipboard format for holding an ID list of objects. This clipboard format is useful in computer systems that have objects with associated ID's that may be aggregated into an ID list. The ID list clipboard format is useful when objects are transferred using a data transfer mechanism.

BRIEF DESCRIPTION OF THE DRAWINGS

A preferred embodiment of the present invention will be described in more detail below with reference to the following figures.

DETAILED DESCRIPTION OF THE INVENTION

The preferred embodiment of the present invention provides an expanded number of clipboard formats. These expanded clipboard formats include clipboard formats that provide improved functionality over those provided by conventional systems.

Figure 1:
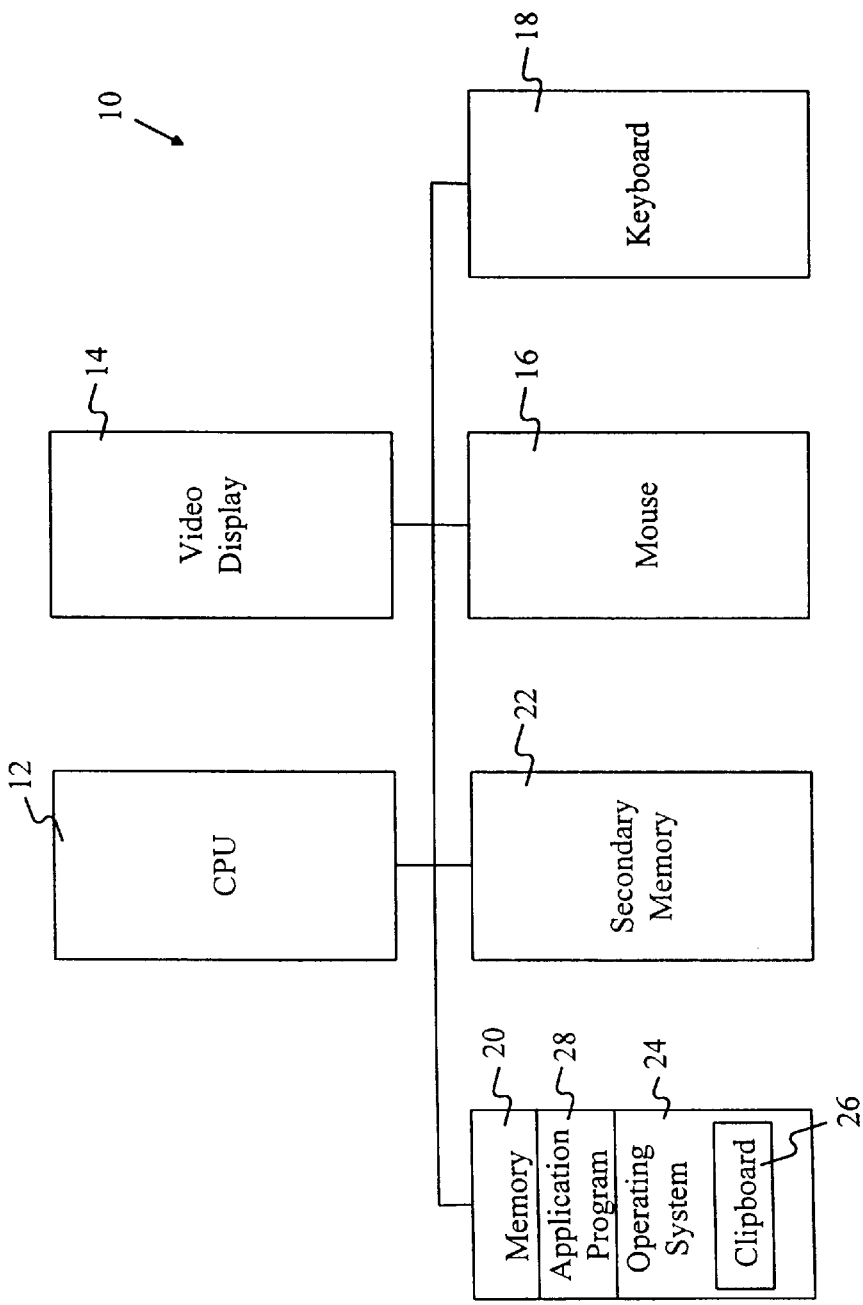
FIG. 1 is a block diagram of a computer system that is suitable for practicing the preferred embodiment of the present invention.

FIG. 1 is a block diagram of a computer system 10 that is suitable for practicing the preferred embodiment of the present invention. The computer system 10 includes a central processing unit (CPU) 12 that has access to several peripheral devices, including a video display 14, a mouse 16, and a keyboard 18. The CPU 12 also has access to a primary memory 20 and a secondary memory 22. The primary memory 20 holds an operating system 24 that includes clipboard 26. The clipboard 26 encompasses messages and functions for providing the clipboard capabilities to realize data transfer and the clipboard formats for practicing the preferred embodiment of the present invention. The primary memory 20 also holds code for at least one application program 28.

Those skilled in the art will appreciate that the computer system 10 of FIG. 1 is intended to be merely illustrative. The present invention may also be practiced in other computer system configurations, including those that employ multiple processors and those that employ peripheral devices that differ from the devices shown in FIG. 1.

The discussion below will focus on enumerating the expanded clipboard formats and their use as provided by the preferred embodiment of the present invention. It should be appreciated that these expanded clipboard formats supplement rather than supersede those provided by the "MICROSOFT" WINDOWS, version 3.1, operating system.

Figure 2:
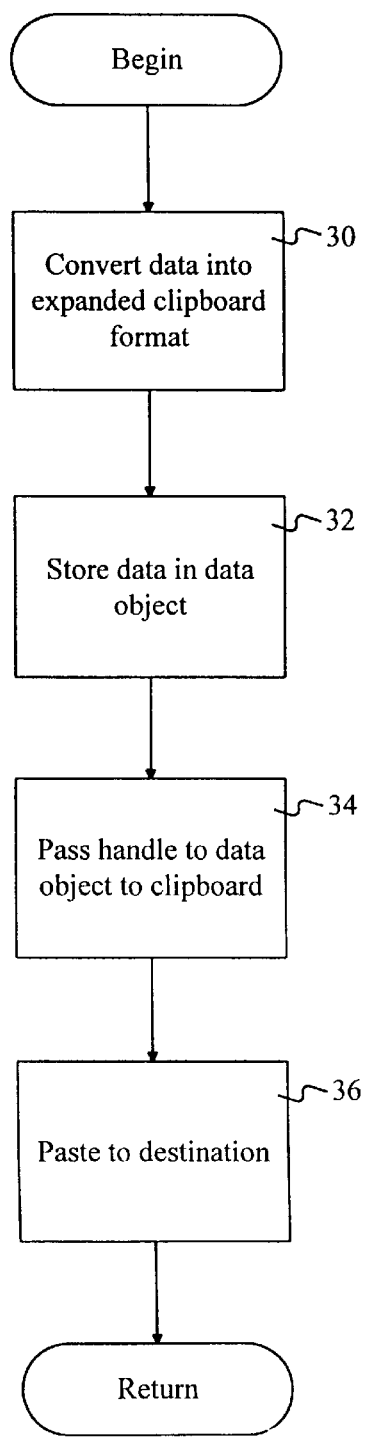
FIG. 2 is a flowchart illustrating steps that are performed to exploit the expanded clipboard formats of the preferred embodiment of the present invention.

FIG. 2 is a flowchart illustrating the steps that are performed to utilize the expanded clipboard formats of the preferred embodiment. Initially, an application program 28 must convert a selected portion of data into one or more of the expanded clipboard formats (step 30). The application program provides the mechanism for selecting the data that is to be converted into the expanded clipboard format. The converted data is stored in a data object (step 32). The data object may be in different types of storage mediums (such as provided by "MICROSOFT" OLE 2.01), including global memory, a stream or a storage. Data objects for some of the expanded clipboard formats may appear in only a subset of the possible storage mediums, as will be described in more detail below. A handle to a data object that encapsulates the data structure is passed to the clipboard (step 34). The data is then considered to be on the clipboard in the expanded clipboard format and is pasted to a destination as desired by the user or application program (step 36).

One of the expanded clipboard formats provided by the preferred embodiment of the present invention is the CF_HDROP clipboard format. For purposes of explaining the role of this clipboard format, it is helpful to first review how a drag-and-drop operation is performed in the "MICROSOFT" WINDOWS, version 3.1, operating system. In this conventional operating system, the drag-and-drop operation is performed in response to a user using a mouse. When the mouse button is released to perform a drop, the window in which the mouse cursor currently points receives a WM_DROPFILES window message. This window message contains a single parameter, hDrop. The hDrop parameter is a handle to a data structure that describes the file or files that have been dropped. The handle is used as a parameter in calls to the predefined DragQueryPoint(), DragQueryFile(), and DragFinish() functions that retrieve information from the data structure identified by hDrop.

The CF_HDROP clipboard format is used to hold the handle to a DROPFILES structure. The CF_HDROP clipboard format requires that the data object (i.e., DROPFILES) be in global memory. The DROPFILES structure has the following format:

```
typedef struct_DROPFILES {
    DWORD pFiles;          // offset of file list
    POINT pt;              // drop point (client coords)
    WORD fNC;              // is it on non client area
        // and pt is in screen coords
    BOOL fWide;            // WIDE character switch
} DROPFILES, *LPDROPFILES;
```

The fWide field indicates that the strings referenced by pfiles are in UNICODE rather than ANSI.

The DragQueryPoint() function, the DragQueryFile() function, and the DragFinish() function all may act upon the DROPFILES structure to retrieve information about dropped files. The use of the CF_HDROP clipboard format enables the above-described functions to operate for clipboard operations as well as OLE data transfer operations. In conventional systems, these functions operate only in drag-and-drop situations.

Figure 3:
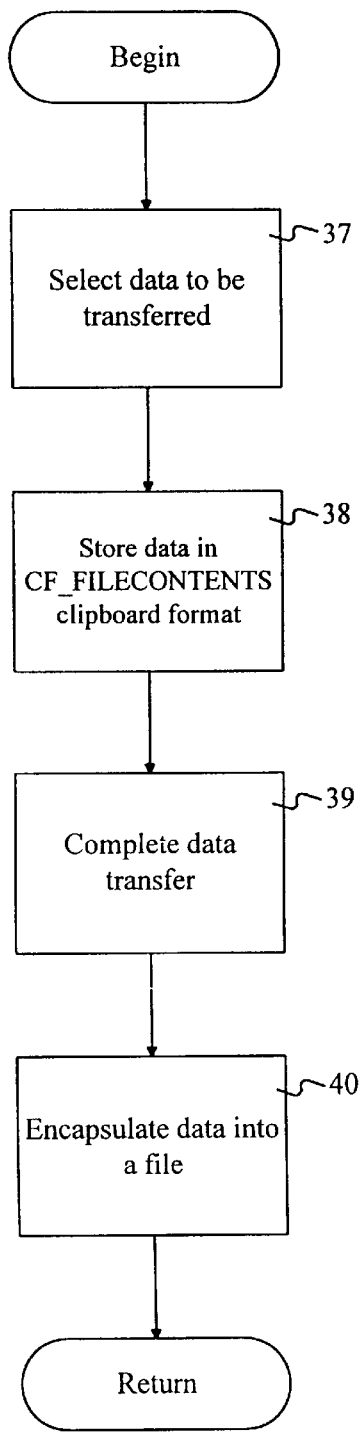
FIG. 3 is a flowchart illustrating the steps that may be performed to use a CF_FILECONTENTS clipboard format in a data transfer operation per the preferred embodiment of the present invention.

The expanded clipboard formats of the preferred embodiment of the present invention also include the CF_FILECONTENTS clipboard format and the CF_FILEGROUPDESCRIPTOR clipboard format. The CF_FILECONTENTS clipboard format is used to hold data that is to be encapsulated into a file. For example, suppose that a user wishes to drag an embedding out of a mail message or other compound document and drop it on a location to create a file. In such an instance, the steps shown in the flowchart of FIG. 3 are performed. First, the data to be transferred is selected (step 37). The data is converted into the CF_FILECONTENTS clipboard format and stored (step 38). The data transfer operation is then completed (step 39) so that the target object of the drag-and-drop has access to the data that is stored in the CF_FILECONTENTS clipboard format. The data in the CF_FILECONTENTS clipboard format is then encapsulated into a file (step 40). Although this example was drag and drop, it should be appreciated that CF_FILECONTENTS may be used with other types of data transfer operations.

In order to appreciate the role that clipboard formats serve in data transfer operations with the Microsoft OLE 2.01 protocol, it is helpful to review some fundamental concepts of OLE 2.01. An "object," in OLE 2.01, is a logical structure that includes data structures for holding data and may include functions that operate on the data held in the data structure.

Another concept that is fundamental to OLE 2.01 is the notion of an "interface." An interface is a name set of logically related functions. An interface lists signatures (such as parameters) for a set of functions. An interface does not provide code for implementing the functions; rather, the code for implementing the functions is provided by objects. Objects that provide the code for implementing the functions of an interface are said to "support" the interface. The code provided by an object that supports the interface must comply with the signature provided with the interface. In the C++ program language, an interface constitutes a set of virtual functions. The Microsoft OLE 2.01 protocol defines an IDataObject interface that group several functions which are useful for an object to transfer data. Objects that support the IDataObject interface are known as data objects.

During a drag-and-drop operation in which data is dragged from a source object to a target object in a system that uses OLE 2.01 to effect the data transfer, a uniform data transfer mechanism as defined in co-pending application entitled "Uniform Data Transfer," which was filed on Feb. 22, 1994, Ser. No. 08/199,853, and assigned to a common assignee with the present application, is utilized. The connection between a data object at the data source and the target object is established by passing a pointer for an instance of the IDataObject interface provided by the data object to the destination object. The destination object then executes the EnumFormatEtc() function of the IDataObject interface to enumerate the available formats for the data in the object that has been dropped on the destination object. These formats are clipboard formats. Thus, during drag-and-drop operations, the data is transferred in a clipboard format.

The CF_FILEGROUPDESCRIPTOR clipboard format is used to hold a file group descriptor structure. The file group descriptor structure holds one or more file descriptors. Each file descriptor is an array of structures that hold information about data to be encapsulated into a file that is held in the CF_FILECONTENTS clipboard format. A file descriptor has the following format:

```
typedef struct_FILEDESCRIPTOR { // fod
    DWORD dwFlags;
    CLSID clsid;
    SIZEL sizel;
    POINTL pointl;
    DWORD dwFileAttributes;
    FILETIME ftCreationTime;
    FILETIME ftLastAccessTime;
    FILETIME ftLastWriteTime;
    DWORD nFileSizeHigh;
    DWORD nFileSizeLow;
    CHAR cFileName[ MAX_PATH];
} FILEDESCRIPTOR, *LPFILEDESCRIPTOR;
```

The dwFlags field is a file that indicates which fields hold legal data; the clsid field holds a class ID of the data object that encapsulates the CF_FILECONTENTS data; the sizel field holds a value specifying the size of the CF_FILECONTENTS data; and the pointl field holds a pointer to the object that holds the CF_FILECONTENTS data. The dwFileAttributes field holds a double word of attributes of the data. The ftCreationTime field holds a creation time, the ftLastAccessTime holds a last access time, and the ftLastWriteTime holds a last write time. The nFileSizeHigh field holds the high 32 bits of a 64 bit value that describes the length of the object in bytes, and the nFileSizeLow field holds the low 32 bits of this value. The cFileName field holds characters that specify a filename.

Figure 4:
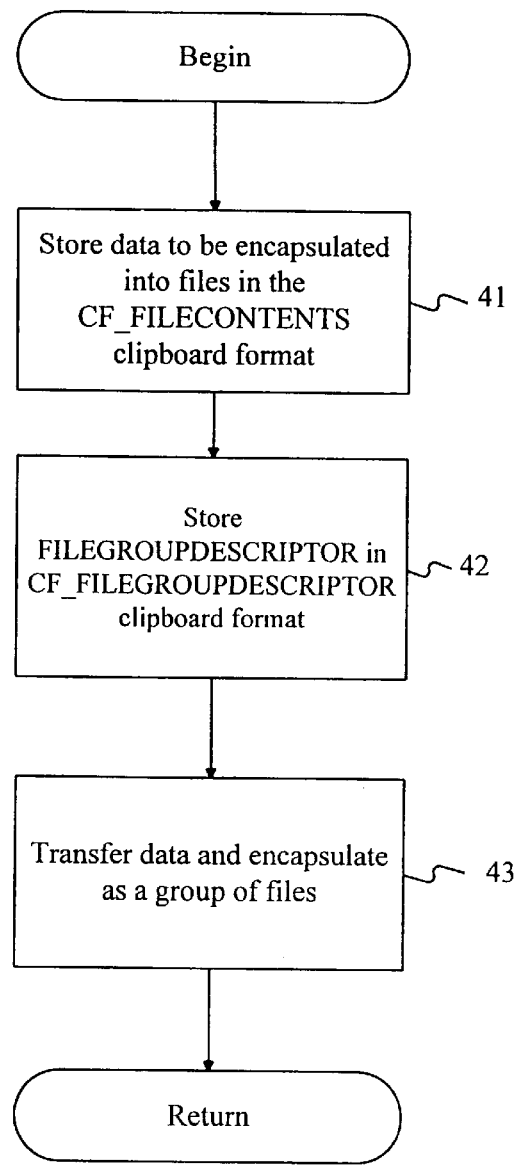
FIG. 4 is a flowchart illustrating the combined use of the CF_FILECONTENTS and CF_FILEGROUPDESCRIPTOR clipboard formats in accordance with the preferred embodiment of the present invention.

The CF_FILEGROUPDESCRIPTOR clipboard format facilitates transferring multiple files in one batch. A file group descriptor in the batch for the batch to be transferred is stored in the CF_FILEGROUPDESCRIPTOR clipboard format. The file group descriptor must be in global memory and not other source media. This file group descriptor enables a program to walk through the data that is to be transferred into multiple files and create the resulting files as needed. FIG. 4 is a flowchart illustrating the steps that are performed to use the CF_FILECONTENTS clipboard format in conjunction with the CF_FILEGROUPDESCRIPTOR clipboard formats to transfer a group of data and create a group of files. The data to be encapsulated into the files must first be converted and stored in the CF_FILECONTENTS clipboard format (step 41). A file group descriptor for the group of data is then stored in the CF_FILEGROUPDESCRIPTOR clipboard format (step 42). The data is transferred and encapsulated into a group of files (step 43).

It should be appreciated that the data objects for holding the data that is transferred in the CF_FILECONTENTS clipboard format may be an object that is present in global memory or may be provided via OLE storage medium such as streams or storages.

Figure 5:
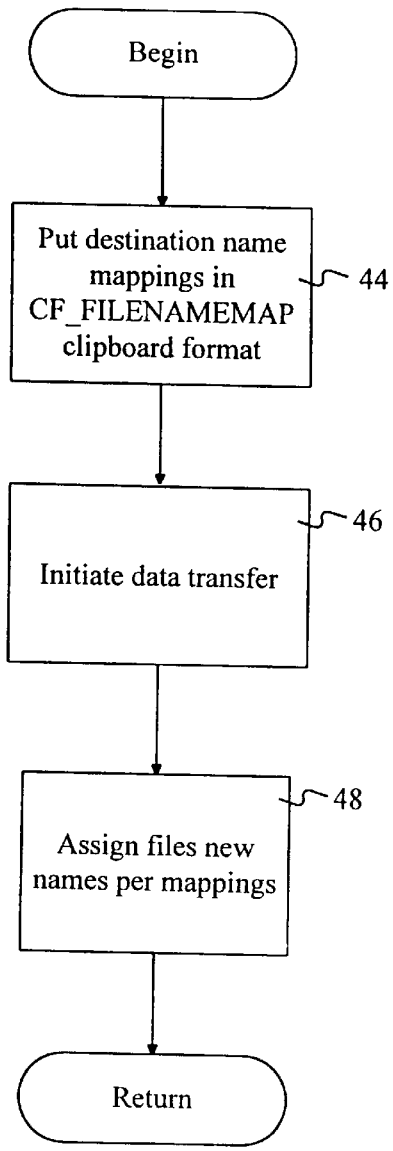
FIG. 5 is a flowchart illustrating the steps that are performed in an exemplary use of the CF_FILENAMEMAP clipboard format in accordance with the preferred embodiment of the present invention.

The CF_FILENAMEMAP clipboard format is another of the expanded clipboard formats provided by the preferred embodiment of the present invention. This clipboard format is used to provide storage for mappings to destination names. For example, suppose that a system wishes to change the name of a file when it is placed in a wastebasket facility. In such a case, the mappings to the destination names are stored in the CF_FILENAMEMAP clipboard format. This clipboard format may be viewed as a companion to the CF_HDROP clipboard format. FIG. 5 is a flowchart illustrating the steps that are performed to utilize this clipboard format to change filenames. First, the destination name mappings are put into the CF_FILENAMEMAP clipboard format (step 44). The data transfer is then initiated via clipboard commands, drag-and-drop or other OLE data transfer mechanisms (step 46). As part of the completion of the data transfer operation, the new filenames specified within the data held in the CF_FILENAMEMAP clipboard format are assigned to the files that are being transferred (step 48).

The expanded clipboard formats also include the CF_OBJECTPOSITIONS clipboard format. This clipboard format is used to hold an array of coordinates that correspond to positions of other items in the clipboard. The first set of coordinates identifies a screen position of the group of objects and the remaining coordinates specify relative offsets of each item in pixels. This clipboard format is especially useful in transferring groups of objects that have associated icons. The clipboard format allows the preservation of the relative positioning of the group of item to remain the same after the data transfer is affected to a new destination.

Figure 6:
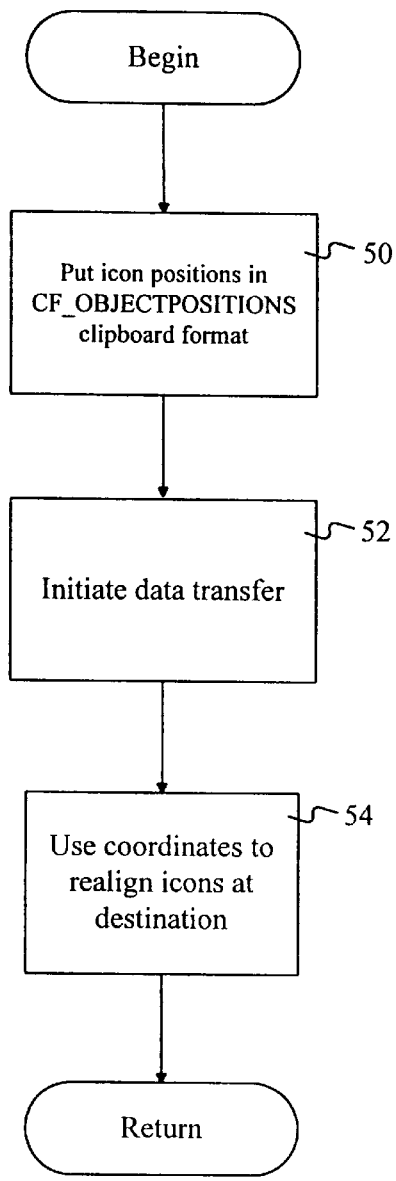
FIG. 6 is a flowchart illustrating the steps that are performed in exemplary use of the CF_OBJECTPOSITIONS clipboard format in accordance with the preferred embodiment of the present invention.

FIG. 6 is a flowchart illustrating the steps that are performed to utilize the CF_OBJECTPOSITIONS clipboard format. Initially, the icons are encoded according to the CF_OBJECTPOSITIONS clipboard format (step 50). The data transfer operation is then initiated via the clipboard, drag-and-drop or other OLE data transfer mechanisms (step 52). As part of the completion of the data transfer operation, the coordinates held in the clipboard format are used to realize the icons in appropriate relative positions at the destination (step 54).

The expanded clipboard formats further include a CF_PRINTERFRIENDLYNAME clipboard format for holding a handle to a list of printer friendly names. The printer friendly names may then be used to gain access to data structures held for the corresponding printers. The CF_NETRESOURCE clipboard format is similar but holds a handle to a list of network resources such as network servers. The list of network resources may be used to gain access to data structures for the resources. This clipboard format is especially used for situations in which a name space may include not only file system structures but other types of objects.

The CF_IDLDATA clipboard format holds a handle to a list of ID lists. An ID, list is a list of identifiers that uniquely identify things within the name space. The ID list may be considered roughly analogous to pathnames for files or directories. This clipboard format may be viewed as a CF_HDROP clipboard format.

While the present invention has been described with references to a preferred embodiment thereof, those skilled in the art will appreciate that various changes in forms of the detail may be made without departing from the intended scope of the present invention as defined by the appended claims.

We claim:

1. A computer system for supporting multiple clipboard formats said computer system comprising:

means for establishing a file list clipboard format that is specially designated for holding a value for accessing a file list structure that describes a list of files involved in a data transfer operation;

a data source for providing data in the file list clipboard format;

a data sink for accepting data in the file list clipboard format; and a data transfer mechanism for transferring the data from the data source to the data sink.

2. A computer system for supporting multiple clipboard formats, said system comprising:

an output device for presenting data;

a data transfer initiating component for initiating a data transfer of a portion of the presented data; and a data transfer component for performing data transfers using a clipboard, said data transfer component comprising:

a first component for establishing a file group descriptor clipboard format for holding a file group descriptor;

a second component for providing a file group descriptor for a group of data for data transfer, said file group descriptor holding file descriptors that contain descriptive information about the group of data that are not files and said file group descriptor being in the file group descriptor clipboard format; and a third component for performing a data transfer of the group data to a location determined by the data transfer initiating component.

3. The system of claim 2, wherein said data transfer component further comprises:

a fourth component for establishing a file contents clipboard format for holding contents of a file.

4. The system of claim 3, wherein said data transfer component further comprises a fifth component for providing the group of data in the file contents clipboard format, and wherein the third component comprises a subcomponent for transferring the group of files in the file contents clipboard format to a location determined by the data transfer initiating component.

5. A method for transferring data using a clipboard with multiple clipboard formats, said method comprising:

converting a selected portion of data into one or more expanded clipboard formats;

storing the converted data in a data object with a handle;

passing the handle to the clipboard; and pasting the data identified by the handle passed to the clipboard to a designated destination.

6. A computer system for transferring data using a clipboard with multiple clipboard formats, said system comprising:

an output device for presenting data;

data transfer initiating component for initiating a data transfer of a portion of the presented data; and a data transfer component for performing data transfers using a clipboard, said data transfer component comprising:

a converting component for converting a selected portion of data into one or more expanded clipboard formats;

a storing component for storing the converted data in a data object with a handle;

a handle passing component for passing the handle to the clipboard; and a pasting component for pasting the data identified by the handle passed to the clipboard to a designated destination.

7. A computer readable storage medium for transferring data using a clipboard with multiple clipboard formats, said computer readable storage medium comprising:

a converting component for converting a selected portion of data into one or more expanded clipboard formats;

a storing component for storing the converted data in a data object with a handle;

a handle passing component for passing the handle to the clipboard; and a pasting component for pasting the data identified by the handle passed to the clipboard to a designated destination.

* * * * *

UNITED STATES PATENT AND TRADEMARK OFFICE
CERTIFICATE OF CORRECTION

PATENT NO. : 5,924,099
DATED : July 13, 1999
INVENTOR(S) : C.J. Guzak et al.

It is certified that error appears in the above-identified patent and that said Letters Patent is hereby corrected as shown below:

| COLUMN | LINE | |
|---|---|---|
| Pg. 1, col. 2 | Attorney, Agent, or Firm | After "O'Connor" delete ";" |
| 6 | 67 | After "ID" delete "," |
| 7 (Claim 1, | 13 line 2) | After "formats" insert --,-- |
| 8 (Claim 6, | 20 line 5) | Before "data transfer" insert --a-- |

Signed and Sealed this

Twenty-fifth Day of April, 2000

Attest:

Q. TODD DICKINSON

*Attesting Officer*     *Director of Patents and Trademarks*